March 17, 1925.
J. SALUS
1,530,207
SHOCK ABSORBER
Filed Nov. 3, 1923
3 Sheets-Sheet 1
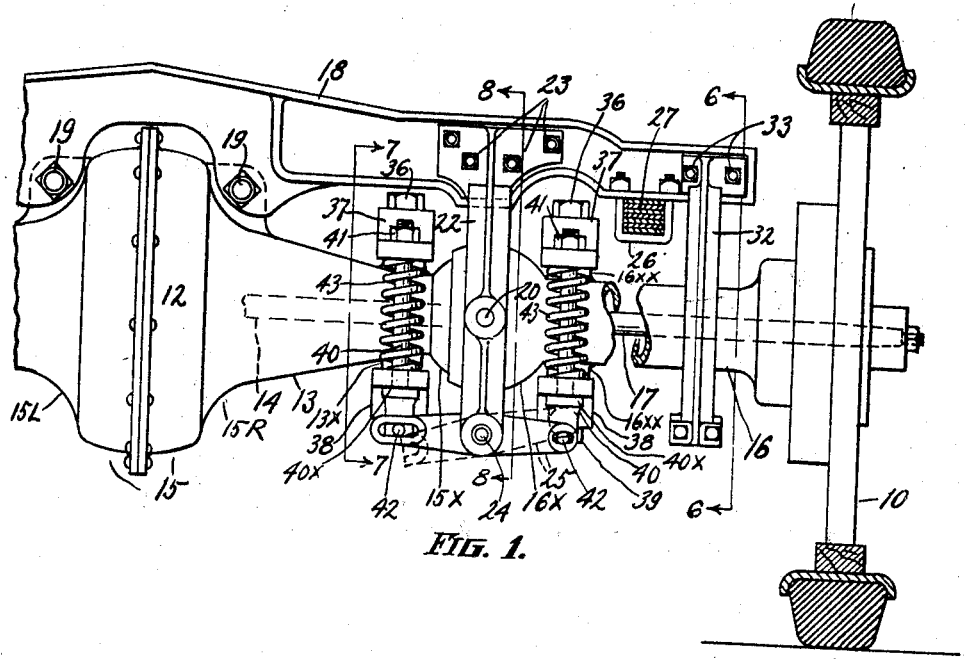
FIG. 1.
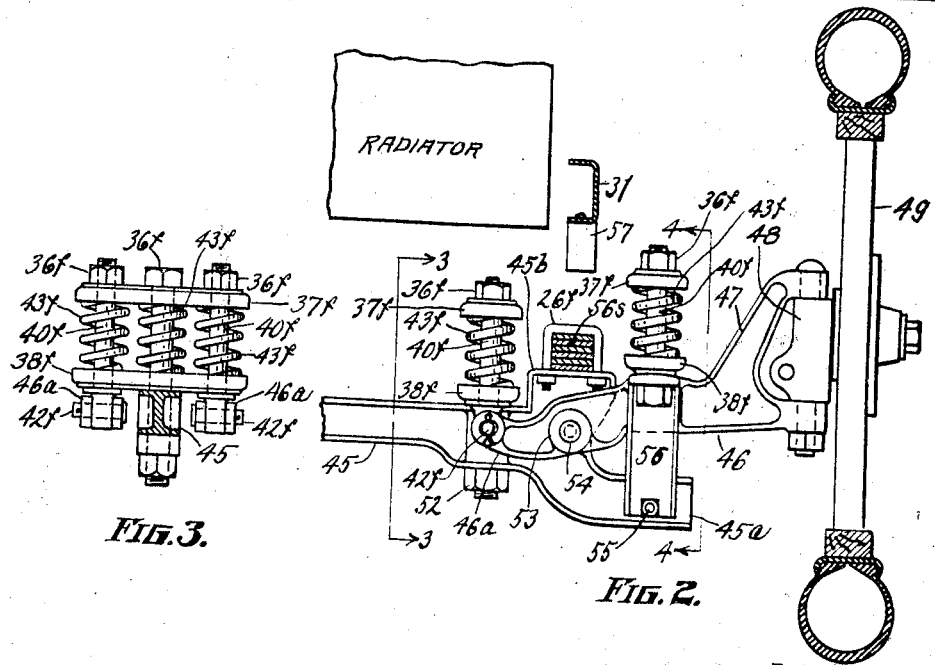
FIG. 3.
FIG. 2.
INVENTOR:
Joseph Salus
BY A. M. Carlsen
ATTORNEY.

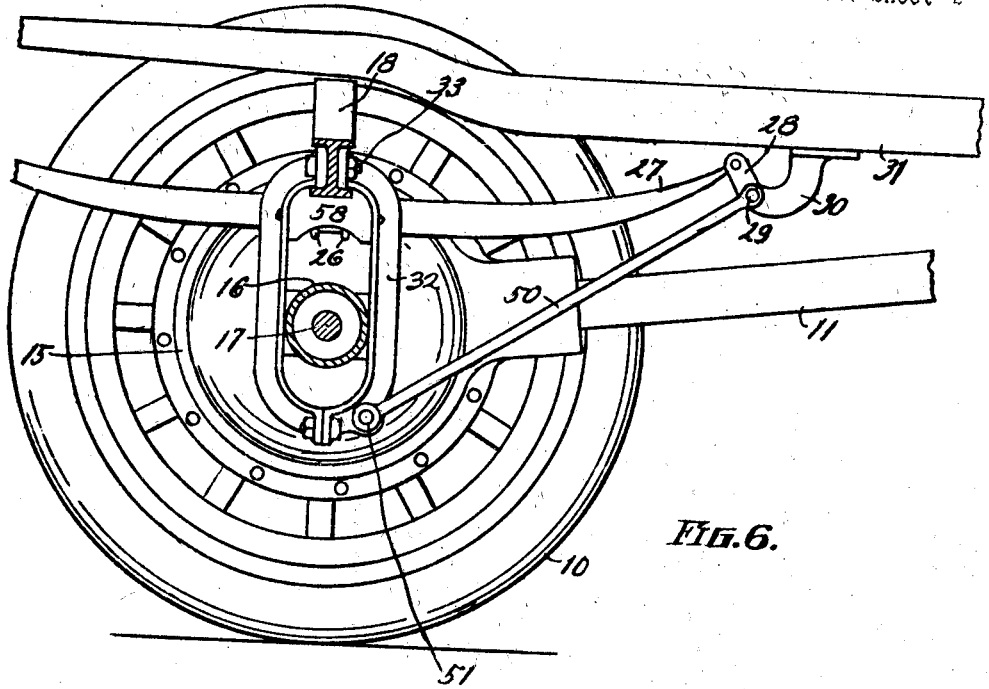

Patented Mar. 17, 1925.

1,530,207

UNITED STATES PATENT OFFICE.

JOSEPH SALUS, OF ST. PAUL, MINNESOTA.

SHOCK ABSORBER.

Application filed November 3, 1923. Serial No. 672,640.

*To all whom it may concern:*

Be it known that I, JOSEPH SALUS, a citizen of the United States, residing at St. Paul, in the county of Ramsey and State of Minnesota, have invented certain new and useful Improvements in Shock Absorbers, of which the following is a specification.

My invention relates to shock absorbers for vehicles in general but more particularly adapted for motor driven vehicles.

The object is to provide an axle designed to absorb the initial shock caused by any unevenness or obstructions ordinarily encountered by the ground wheels of an auto vehicle. It will be understood that the regular leaf springs of an automobile or like vehicle equipped with my device may be retained, as hereinafter described, and illustrated in the accompanying drawings, in which:

Fig. 1 is a rear elevation of a rear drive axle of an auto vehicle showing only the center and right hand end thereof and the right hand ground wheel partly in section, and my device incorporated therewith.

Fig. 2 is a front view of approximately the whole left half of a front axle of an automobile, some of the adjacent auto parts and the left ground wheel partly in section, and my device incorporated in proper position on the axle.

Fig. 3 is an elevation on line 3—3 in Fig. 2.

Fig. 4 is an elevation on line 4—4 in Fig. 2.

Fig. 5 is a top view of the axle sections 45 and 46 in Fig. 2.

Fig. 6 is an elevation on line 6—6 in Fig. 1 and some added parts of an automobile body.

Figure 7:
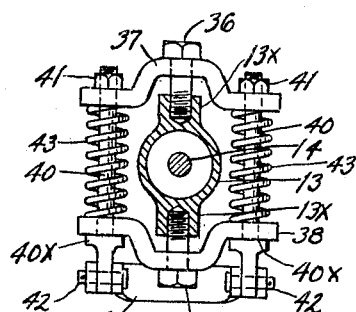
Fig. 7 is a sectional elevation approximately as on line 7—7 in Fig. 1.

In the drawings I have illustrated my device as applied and incorporated in the front axle and rear axle of a pleasure car or truck but it will be understood that for axles of various designs the design of my device must be varied to suit. The general construction disclosed is applicable to all motor driven vehicles, trailers or horse drawn vehicles.

Referring to the drawings by reference numerals, my device involves the use of three-part axles, namely, each axle has a center section and two opposite end sections pivotally secured to the center section in a manner to permit only vertical oscillation of said end sections.

In Fig. 1 is shown a rear or drive axle through which power is transmitted to the ground wheels 10 (only one shown) from the drive shaft 11 (see Fig. 6). 12 is the usual differential housing with the hollow axle 13 containing the drive shaft 14 (Fig. 6) hitherto extended to and keyed in the hub of the ground wheel 10. Fig. 1 illustrates mainly the right side of the drive axle in which 15 is the main or central part of it including the differential housing having integral axle housings 15R and 15L. Each of the latter terminates in a hollow ball and socket joint of which the ball $15x$ is preferably a part of housing 15R or 15L fitted snugly into a socket member $16x$ comprising the inner end of a drive shaft housing 16 linearly arranged with the housing 13 and enclosing a drive shaft extension 17 the outer end of which is keyed in the hub of the drive wheel.

Figure 8:
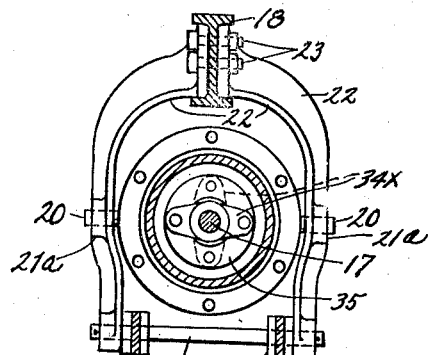
Fig. 8 is a sectional elevation as on line 8—8 in Fig. 1.

18 is a beam arranged longitudinally above the axle housing and secured as at 19 to the latter, 20 are two horizontally arranged pins in the socket $16x$ of each outer axle section and adapted to oscillate in bearings $21a$ of a yoke member 22 secured as at 23 to the beam 18 straddling the axle housing joint and extending below it (see Figs. 1 and 8) the latter ends of the yoke being provided with horizontally registering bearings for a shaft 24 on which is pivotally engaged the center portion of a double rocking yoke 25 normally in spaced relation below and parallel to the drive shaft housings, for a purpose to be described.

26 are U-bolts for securing the usual longitudinally arranged body springs 27 to the beam 18 and 28 is the usual spring end yoke pivoted at 29 to a bracket 30 secured on the auto body frame member 31 (see Figs. 1 and 6).

32 is a vertically arranged slotted bracket secured with its upper end at 33 near the outer end of beam 18 and straddling the outer axle housing so that the latter may move only vertically within it (see Figs. 1 and 6). 50 is a so-called radius rod secured to bracket 30 at its forward end and the rear end secured to the lower end of bracket 32, as at 51, to brace said bracket. The inner and outer drive shaft sections 14 and 17, respectively, are connected by any suitable type of universal joint within the ball and socket joint of the axle housing, but in Fig. 6 I have illustrated a preferred form of joint, namely the flexible disc type in which the alternately spaced fingers 34x of the shaft sections are secured to the flexible disc 35 through which power is transmitted from shaft 14 to 17 to rotate the drive wheel 10.

It is of course desirable to keep the drive shaft sections in horizontal alinement while they are transmitting power to the ground wheels, but when either or both of the said drive wheels run over obstructions or into hollows in a road surface I provide means mounted on and adjacent the above described ball and socket joint which permit the outer housing sections to oscillate on pivot pins 20 and in a vertical plane only. The said means, which will now be described, absorb all or nearly all of the initial shock caused by the vertical movement of the wheels and the central section of the axle, with its differential gears, etc., receives little or no shock and consequently there is a comparatively small vertical movement of the beam 18 and little if any vibration transmitted to the body of the auto through the body springs 27.

The above mentioned means comprise two sets of compression springs for each axle housing joint. Adjacent the ball joint I provide on each of the housings 13—16, two integral vertically and diametrically opposite embossments 13x and 16xx, upper and lower respectively, the upper ones of said lugs each threaded for a cap screw 36 under the head of which is spring pressed a cross bar 37 (see Figs. 1 and 7) each cross bar arranged transversely above the axle housing. A similar cross bar 38 is held in like position vertically below the housing by a cap screw 39. The ends of all of said cross bars are drilled for vertically slidable shouldered bolts 40 each passed upwardly from under the lower bar 38 and through the top bar 37, the protruding upper end being threaded for a nut 41. The shoulder portion 40x of the bolts engage the lower cross bars 38 (Fig. 7) and below said shoulder each bolt is drilled horizontally to be engaged by a pivot pin 42 in one of the free ends of the pivoted double yoke 25. A helical coil spring 43 is interposed between the upper and lower cross bars and about each bolt 40 and by adjusting the nuts 41 the said springs may be compressed until the springs on opposite sides of the axle joint will maintain the axle sections in proper linear relation under normal load carrying conditions.

It will be understood, that if, for example, the wheel 10 should suddenly hit a rock or other obstacle on the road it will of course raise the wheel vertically and the outer axle housing will be swung upwardly on its pivot 20. This action causes the lower, outer bar 38 to move upwardly with said axle section 16 and the upper bar 37 moves upwardly also carrying the shoulder pins 40 with them and causing the normally horizontal yoke 25 to be tilted up on that side (see dotted line position of 25 in Fig. 1). The opposite side of said yoke (as in Fig. 1) will of course be rocked downwardly, automatically pulling down the shoulder pins or bolts 40 adjacent the inner axle section and compressing their springs 43 between the cross bars 37 and 38 to an extent only limited by the amount the springs can be compressed, as the upper bar (37) may slide downwardly on the shank of its cap screw 36.

Similar effect is produced on the springs and cross bars to the right of the ball and socket joint (in Fig. 1) if the wheel 10 suddenly sinks into a rut or hollow and which would cause the yoke 25 to rock with its right hand end down. In either case the compressed springs tend to spring back to normal position and line up the drive shaft sections in proper linear relation when the wheel resumes running on the smooth surface of the road.

Figs. 2, 3, 4, 5 and 9 illustrate necessary modifications and changes in construction of my device as applied to the front axle of an automobile because of the different type of axle used and the mounting of the ground wheels, the latter wheels of course being the steering wheels.

In the front axle construction the same principle is used as in the rear axle, namely, there are three axle parts, the central or main part 45 of I-shape in vertical cross section and two end sections 46 each with a vertical yoke 47 at its outer end and in which is pivotally mounted the turning spindle 48 of the front wheel 49.

In the above mentioned Figures (2, 3, 4, 5 and 9) illustrating the front axle construction, parts similar to those used in the rear axle have been given like numbers but with the suffix *f* added to avoid confusion. There being no hollow axle housing and drive shaft involved in the front axle I have used a long bolt 36f in place of cap screw 36 on the rear axle, said bolt 36f extending through axle 46 and having a nut 52 at its lower end and a third spring 40f placed in compression, about said bolt, and between the bars 37f and 38f. This provides for excess weight on the front axle which usually supports the motor of an automobile.

The front axle of my device requires no rocking yoke (as 25 of rear axle) but I make the inner end of axle section 47 in the form of a horizontally disposed yoke 46a with transversely registering bearings 53 for a pin 54 passed through the outer end portion of shaft section 45, providing a pivot on which said axle section may be tilted in a vertical plane. The inner ends of yoke 46a have each a pin 42f engaging the lower end of one of the spring bolts 40f (see Figs. 2, 3, 4 and 5). Axle 45 is provided at each end with an integral, lateral extension 45a to which is bolted, as at 55, the lower ends of two oppositely arranged, inverted L-shaped brackets 56 through the upper portion of which I extend bolts 40f with springs 43f (see to right of pivot 54 in Fig. 2 and also Fig. 4). In said Figures 2 and 4 it will be noted that bar 38f rests on top of axle 46. The spring action is the same as on the rear axle, above described when one or both ground wheels strike a bump or a depression such as are commonly encountered on mostly any road.

Figure 9:
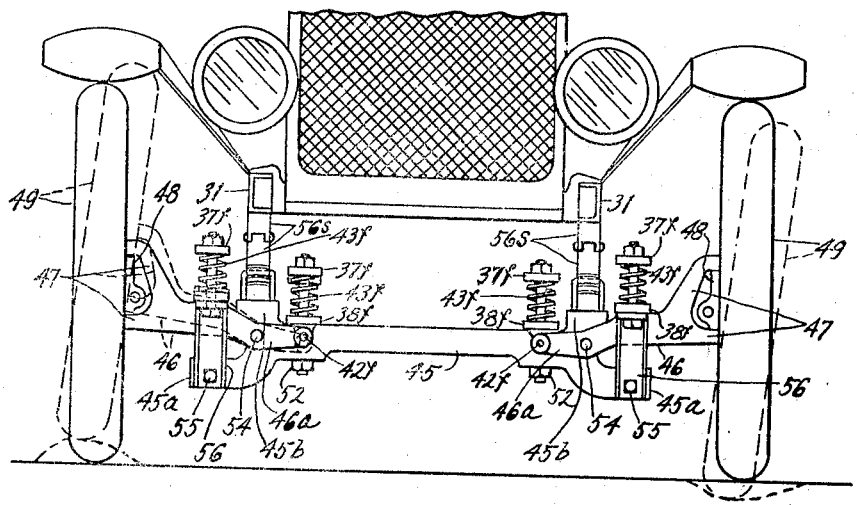
Fig. 9 is a front view of an automobile with my improvements incorporated on its front axle.

56S in Figures 2 and 9 are the usual front body springs of an automobile, each secured on a raised part 45b of the axle section 45 by U-bolts 26f.

57 is a bumper of rubber or other resilient material secured on the body frame 31 (see Fig. 2) to prevent excessive upward movement of springs 56S, 58 in Fig. 6 is a like rubber bumper suitably secured in the upper part of the slotted bracket 32 to prevent excessive upward movement of either rear axle housing section 16.

The operation of my invention has been fully disclosed in the above specification.

I claim:

1. In a vehicle axle, a horizontally arranged main section adapted to support a vehicle body, two opposite end sections each with its inner end pivotally secured to one end of the main section and its outer end adapted to carry one of the ground wheels and means for normally retaining all said axle sections in horizontal alinement, said alinement means consisting of two groups of vertically disposed springs under variable compression adjacent each pivot, said groups arranged equi-distant from the pivot longitudinally of the axle and pivoted means connecting said groups of springs, and means for compressing said springs at each side of the pivot consisting of an upper horizontal bar arranged above the axle, a lower bar below the axle, vertically arranged bolts passing through said bars, the springs arranged one about each bolt and between said bars, and a nut for each of said bolts.

2. The structure specified in claim 1, said pivoted means connecting the two groups of compression springs adjacent each axle pivot consisting of a rocker arm pivoted centrally to oscillate in a vertical plane and means connecting said rocker arm with the lower ends of the spring bolts at each side of the axle pivot.

3. The structure specified in claim 1, said pivoted means connecting the two groups of compression springs adjacent each axle pivot consisting of a rocker arm pivoted centrally to oscillate in a vertical plane and means connecting said rocker arm with the lower ends of the spring bolts at each side of the axle pivot, said rocker arm pivot arranged in fixed position relative to the pivot of the axle sections.

4. The structure specified in claim 1, said pivoted means connecting the two groups of compression springs adjacent each axle pivot consisting of a rocker arm pivoted centrally to oscillate in a vertical plane and means connecting said rocker arm with the lower ends of the spring bolts at each side of the axle pivot, said rocker arm pivot arranged in fixed position relative to the pivot of the axle sections and said rocker adapted to oscillate in a direction corresponding to the movement of the outer axle section when the ground wheel on the latter contacts with an obstruction or runs into a depression in the road and causing mis-alinement of the axle sections, said oscillating of the rocker arm automatically compressing a number of said springs, the latter tending to consequently expand and re-aline the axle 5. The structure specified in claim 1, said pivoted means connecting the two groups of compression springs adjacent each axle pivot consisting of a rocker arm pivoted centrally to oscillate in a vertical plane and means connecting said rocker arm with the lower ends of the spring bolts at each side of the axle pivot, said rocker arm pivot arranged in fixed position relative to the pivot of the axle sections and said rocker adapted to oscillate in a direction corresponding to the movement of the outer axle section when the ground wheel on the latter contacts with an obstruction or runs into a depression in the road and causing mis-alinement of the axle sections, said oscillating of the rocker arm automatically compressing a number of said springs, the latter tending to consequently expand and re-aline the axle, said rocker arm being arranged to compress the springs at the end of the rocker arm moved downwardly by the oscillating movement of the outer axle section.

In testimony whereof I affix my signature.

JOSEPH SALUS.